United States Patent

Ikeda et al.

[11] Patent Number: 5,772,788
[45] Date of Patent: Jun. 30, 1998

[54] REMOVING AGENT FOR SILICONE FILM ADHERING TO PANES AND METHOD FOR REMOVING SILICONE FILM

[75] Inventors: Atsushi Ikeda; Seigo Shinohara, both of Kanagawa-ken, Japan

[73] Assignee: Taiho Industries Co., Ltd., Tokyo, Japan

[21] Appl. No.: 740,395

[22] Filed: Oct. 29, 1996

[30] Foreign Application Priority Data

Oct. 31, 1995 [JP] Japan .................................. 7-283640

[51] Int. Cl.$^6$ ................................ B08B 7/00; C23G 1/02
[52] U.S. Cl. ................................ 134/38; 134/3; 252/193
[58] Field of Search .......................... 134/3, 38; 252/193

[56] References Cited

U.S. PATENT DOCUMENTS 4,496,398  1/1985  Whitehouse ............................ 106/181

Primary Examiner—Kriellion S. Morgan
Attorney, Agent, or Firm—Browdy and Neimark

[57] ABSTRACT

A removing agent being capable of removing silicone film adhering fast to the surface of a pane of vehicles quickly, easily, evenly and completely, and a method for removing silicone film adhering to the surface of a pane completely without any of the removing agent left on the surface are provided. The removing agent comprises water and at least one acidic fluoride selected from the group consisting of an acidic ammonium fluoride and an acidic potassium fluoride wherein an amount of the acidic fluoride is from 0.15 to 15 wt % of the total amount of the agent. The removing agent further includes a powder at need.

16 Claims, No Drawings

REMOVING AGENT FOR SILICONE FILM ADHERING TO PANES AND METHOD FOR REMOVING SILICONE FILM

BACKGROUND OF THE INVENTION

1. Field of the Invention

This invention relates to a removing agent for silicone film adhering to the surface of a pane and a method for removing silicone film from the surface of a pane. In particular, this invention relates to a removing agent being capable of removing silicone film adhering fast to the surface of panes of vehicles such as automobiles, aircraft, ships or trains quickly, easily, evenly and completely, and a method for removing silicone film adhering to the surface of a pane completely without any of the removing agent left on the surface.

2. Description of Related Art

Many water repellents for increasing water repellency of a pane, such as a windshield, of automobiles or aircraft have been marketed recently. Among them, a silicone water repellent comprising an alkyl polysiloxane dissolved in alcohols including an acid such as sulfuric acid can easily form a water repellent silicone film on the surface of a pane, and the formed film strongly adheres to the surface. This depends on a dehydration reaction of silanol groups of the surface of the pane with silanol groups of the alkyl polysiloxane to form strong bonding of glass of the pane with the alkyl polysiloxane by siloxane bonds. Thus the silicone water repellent is widely used.

However, water repellency of the surface of a pane provided by the silicone water repellent deteriorates due to physical or chemical factors. Therefore it becomes necessary to remove silicone film which has been formed from the surface of a pane, and then to form a new silicone film on the surface. Further, when the surface of a pane becomes stained with dirts of silicones for some reasons, removing of the dirts is required.

In these cases, silicone film have been removed from the surface of a pane by the following method. The surface was wet-sanded with a dispersion including finely divided particles of silica as an abrasive and the silicone film was physically sanded off.

This method, however, is troublesome and requires a lot of work and time. In addition, silicone film cannot be removed from the surface of a pane evenly and completely by this method.

SUMMARY OF THE INVENTION

The present invention has been made in order to solve the aforementioned problems. A purpose of the invention is to provide a removing agent being capable of removing silicone film adhering fast to the surface of a pane of vehicles such as automobiles, aircraft, ships or trains quickly, easily, evenly and completely without making scratches on the surface. Another purpose of the invention is to provide a removing agent comprising a composition including an acidic fluoride, for removing silicone film adhering to the surface of a pane, which does not harm the pane by the acidic fluoride left on the surface after the removing operation. A further purpose of the invention is to provide a removing agent with which silicone film adhering to the surface of a pane can easily be removed from the surface and which can easily be detected if some of it are left on the surface after the removing operation. A furthermore purpose of the invention is to provide a method for removing silicone film adhering fast to the surface of a pane of vehicles such as automobiles, aircraft, ships or trains quickly, easily, evenly and completely without making scratches on the surface, and by the method a removing agent for silicone film adhering to the surface of a pane can easily be detected if some of it is left on the surface after the removing operation.

In order to achieve the purposes, one aspect of the invention is a removing agent for silicone film adhering to the surface of a pane which comprises water and at least one acidic fluoride selected from the group consisting of an acidic ammonium fluoride and an acidic potassium fluoride wherein an amount of the acidic fluoride is from 0.15 to 15 wt % of the total amount of the agent.

Another aspect of the invention is a removing agent for silicone film which comprises at least one acidic fluoride selected from the group consisting of an acidic ammonium fluoride and an acidic potassium fluoride, water and a powder, wherein an amount of the acidic fluoride is from 0.15 to 15 wt % of the total amount of the agent.

A further aspect of the invention is a removing agent for silicone film which further includes ammonium fluoride of once to twice as much by weight as the acidic fluoride.

A furthermore aspect of the invention is a removing agent for silicone film which further includes an alkaline metal fluoride of once to twice as much by weight as the acidic fluoride.

An another aspect of the invention is a method for removing silicone film which comprises applying one of the above-mentioned agents to the surface of a pane, removing a liquid component, and removing a powder component from the surface.

DESCRIPTION OF THE PREFERRED EMBODIMENTS

A Removing Agent for Silicone Film Adhering to the Surface of a Pane

A removing agent for silicone film adhering to the surface of a pane comprises water and a specific acidic fluoride as essential components, and further includes a powder. Thus the removing agent can effectively remove silicone film. The removing agent may further comprise ammonium fluoride, an alkaline metal fluoride and other components at need.

(A) Water

Water is not specially limited and can be chosen according to circumstances. Examples are a city water, an ion-exchanged water, groundwater, spring water and a filtered water.

(B) Acidic Fluoride

An acidic fluoride of the invention is at least one selected from an acidic ammonium fluoride and an acidic potassium fluoride. They can be used singly or in combination.

An acidic ammonium fluoride of the invention is represented by the general formula of $NH_4F \cdot HF$. It has colorless crystals in a rhombic system or a monoclinic system.

For the acidic ammonium fluoride, a product synthesized from an acidic solution of hydrogen fluoride and liquid ammonia or a commercially available product can be used. Standards on acidic ammonium fluorides can be found in JIS K 1407-78 of Industrial Chemicals and JIS K 8817-79 of Reagents. The acidic ammonium fluoride also includes a flaky acidic ammonium fluoride.

An acidic potassium fluoride of the invention is represented by the general formula of $KF \cdot HF$. It has colorless crystals in a tetragonal system. Standards on acidic potassium fluorides can be found in JIS K 8818-79 of Reagent.

The amount of the acidic fluoride included in the removing agent for silicone film adhering to the surface of a pane is usually 0.15–15 wt %, preferably 1.5–15 wt %, and more preferably 5–12 wt %, of the total amount of the removing agent. When the amount is 0.15–15 wt %, the purposes of the invention can effectively be achieved. When the amount is 1.5–15 wt %, silicone film can more effectively be cleared from the surface of a pane. When the amount is 5–12 wt %, the clearance of silicone film can most effectively be performed.

(C) Powder

The removing agent of the invention has an outstanding ability to remove silicone film because the agent is comprised of the acidic fluoride of the specific amount and water as essential components. On the other hand, the removing agent may cause damage to the surface of glass.

For example, when an excessive amount of the removing agent including these two components is applied to the surface of a pane, or while the acidic fluoride gradually becomes concentrated as the liquid component evaporates after the application, the acidic fluoride may damage the surface of a pane.

A removing agent for silicone film adhering to the surface of a pane further including a powder in addition to the two components solves the above-mentioned problem. The reason will be as follows. While the removing agent applied onto the surface of a pane goes to drying, the acidic fluoride becomes adsorbed and concentrated on the surface of the powder. As a result, the acidic fluoride in such an amount that it can damage the surface of glass does not exist on the surface and the acidic fluoride could exert a very little damage on the surface. It is considered that the powder has a function to prevent the surface of a pane from being damaged by the acidic fluoride. Thus the removing agent can clear silicone film with a very little damage on the surface of glass.

The removing agent including a powder has other merits.

When some of the removing agent is left on the surface of a pane in clearing operation of the removing agent having been applied onto the surface, the powder included in the agent will naturally be left on the surface even if liquid components will have evaporated. Thus the user can easily find parts from which the removing agent is not cleared due to the left powder. The user can completely remove the left powder from the surface by, for example, wiping the powder off the parts, which finally leads to a complete clearance of the removing agent from the surface. It is very important to completely remove the left powder. The reason is as follows. If a removing agent for silicone film adhering to the surface of a pane which does not include a powder is left on some parts of the surface of a pane, the user can not notice existence of the parts and the removing agent can stay on the parts for a long time. Then glass of the parts will considerably be damaged because the acidic fluoride in a concentrated state is left on the parts. As understood from the above-mentioned, a powder included in the removing agent for silicone film adhering to the surface of a pane has a function of the indicator which shows parts where the removing agent is left and a function of allowing the acidic fluoride to concentrate on the powder, so that the acidic fluoride left on the parts can easily be cleared.

Viewed from another angle, a powder left on some parts of the surface of a pane would urge the user to continue the clearing operation of the removing agent, because the user can obviously understand that the removing agent has not completely been cleared from the surface when a powder is left on the surface. Thus the powder also has a function of the indicator for the clearing operation of the removing agent.

The powder comprises an inorganic powder and an organic powder.

The inorganic powder includes alumina, calcium carbonate, aluminum hydroxide, magnesium oxide, titanium oxide, zirconium oxide, zinc oxide, and the like. Among them titanium oxide is preferable. They can be used singly or in combination.

The organic powder includes a powder of acrylic resins such as a homopolymer of methyl methacrylate and a copolymer of methyl methacrylate and ethylene, a nylon resin powder, a polyethylene powder, a polyurethane powder, a styrene resin powder, a urea resin powder, a melamine-formaldehyde resin powder, and the like. Among them acrylic resin powders are preferred. More preferred is a powder of a homopolymer of methyl methacrylate. They can be used singly or in combination.

The inorganic powder and the organic powder can be used in combination.

A particle diameter of the powder should be such that the particles do not injure the surface of a pane and that they do not settle and separate out while the removing agent is stored. Specifically, a particle diameter of 0.5–20 $\mu$m is preferable. When the particles have such a small particle size as that within the above-mentioned range, the powder shows the color of itself. Thus a powder left on the surface can easily be recognized due to the color.

The removing agent of the invention clears silicone film by breaking chemical bonds between a silicon atom of glass and a silicon atom of silicone film with an oxygen atom being inserted therebetween, i.e. siloxane bonds. It is not necessary that the removing agent of the invention include abrasives because the invention does not intend to remove silicone film by sanding or rubbing them with abrasives.

(D) Ammonium Fluoride

Ammonium fluoride may be included in the removing agent for silicone film adhering to the surface of a pane as an auxiliary at need. When the removing agent includes ammonium fluoride, it effectively prevents the acidic ammonium fluoride from dissolving into hydrogen fluoride, which evaporates out. Thus inclusion of ammonium fluoride can keep the removing agent's ability in clearing silicone film high.

Ammonium fluoride is represented by the general formula of $NH_4F$. It is in needle crystals of a hexagonal system. For the removing agent of the invention, either of a synthesized product or a commercially available one may be employed.

It is preferable that ammonium fluoride is included in the removing agent in an amount of once to twice as much by weight as the acidic fluoride. In this case the ability of the removing agent to clear up silicone film is enhanced.

(E) An Alkaline Metal Fluoride

An alkaline metal fluoride may be included in the removing agent for silicone film adhering to the surface of a pane as an auxiliary at need. When the removing agent includes an alkaline metal fluoride, it effectively prevents the acidic ammonium fluoride from dissolving into hydrogen fluoride, which evaporates out. Thus inclusion of an alkaline metal fluoride can keep the removing agent's ability in clearing silicone film high.

Examples of the alkaline metal fluoride are sodium fluoride, potassium fluoride, etc.

Sodium fluoride is represented by the general formula of NaF. It has colorless crystals in a cubic system. For the removing agent of the invention, either of a synthesized product or a commercially available one may be employed. Standards on sodium fluoride products can be found in JIS K 1406-57 of Industrial Chemicals and JIS K 8821-79 of Re-agents. Sodium fluoride products in the form of a pellet can also be employed.

When sodium fluoride is employed as an auxiliary, it sometimes happens that part of the sodium fluoride does not dissolve in water and the sodium fluoride solids are dispersed in the removing agent, because sodium fluoride is poorly soluble in water. These solids function as an abrasive and do not give adverse effects.

Potassium fluoride is represented by the general formula of KF. It is in the form of a bulky fine powder. For the removing agent of the invention, either of a synthesized product or a commercially available one may be employed.

When potassium fluoride is employed as an auxiliary, there is a very little possibility that all of the potassium fluoride does not dissolve in water and the potassium fluoride solids are dispersed in the removing agent, because the solubility of potassium fluoride to water is great. Potassium fluoride dissolved in water can prevent the acidic ammonium fluoride from dissolution and evaporation.

It is preferable that an alkaline metal fluoride is included in the removing agent in an amount of once to twice as much by weight as the acidic fluoride. In this case the ability of the removing agent to clear up silicone film is enhanced.

(F) Other Components

The removing agent of the invention may include other components so long as they do not mar the purposes of the invention. Examples of the other components are various additives such as alcohols, surfactants, preservatives, stabilizers, etc. When at least one of the other components selected according to purposes is included in the removing agent for silicone film adhering to the surface of a pane, the inclusion will further enhance the properties of the removing agent or will add new characteristics to the original properties.

Alcohols

The alcohols comprise univalent alcohols and polyvalent alcohols.

Examples of the univalent alcohols are methanol, ethanol, n-propanol, 2-propanol, n-butanol, 2-methylpropanol, 2-butanol, 2-methyl-2-propanol, n-pentanol, 3-methylbutanol, 2-methyl-1-butanol, 2-methyl-2-butanol, 2,2-dimethylbutanol, n-hexanol, n-octanol, 2-octanol, n-decanol, n-dodecanol, n- tetradecanol, n-hexadecanol, n-octadecanol, etc.

Examples of the polyvalent alcohols are 1,2-ethanediol, 1,2-propanediol, 1,3-propanediol, 1,4-butanediol, 2,3-di-methyl-butanediol, 1,2,3-propanetriol, etc.

The alcohol is usually included in an amount of 10 wt % or less of the total amount of the removing agent for silicone film adhering to the surface of a pane.

Surfactants

The surfactants include anionic, cationic, nonionic and amphoteric surfactants, and the like.

Examples of the anionic surfactants are an organic acid salt such as a carboxylate and a sulfonate, a sulfate, a phosphate, etc.

The carboxylate includes sodium laurate, potassium laurate, sodium myristate, sodium palmitate, sodium stearate, sodium oleate, potassium oleate, an ether carboxylate, etc.

The sulfonate includes a higher alkyl sulfonate, a sulfonate of an α-olefin, a sulfonate of a higher aliphatic acid ester, a dialkyl sulfosuccinate, a sulfonate of a higher aliphatic amide, an alkylaryl sulfonate such as an alkylbenzene sulfonate, an alkylnaphthalene sulfonate and a formaldehyde-condensed alkylaryl sulfonate, etc.

The sulfate includes a sulfate of a higher alcohol, a sulfate of a higher secondary alcohol, a sulfate of an alkyl-ether, a sulfate of an alkylarylether, an alkylsulfate, a sulfate of a higher aliphatic ester, a sulfate of a higher aliphatic acid alkylol amide, a sulfated oil, etc.

The phosphate includes sodium didecylphosphate, a sodium polyoxyethylene laurylether phosphate, a sodium polyoxyethylene cetylether phosphate, a sodium polyoxyethyl- ene oleylether phosphate, a sodium polyoxyethylene alkylphe- nylether phosphate, etc.

Examples of the cationic surfactants are an amine salt and a quaternary ammonium salt.

The amine salt includes an alkyl amine salt, a polya- mine, a derivative made from an amino alcohol and an ali- phatic acid, etc.

The quaternary ammonium salt includes an alkyl quaternary ammonium salt, an aromatic quaternary ammonium salt such as a pyridinium salt and an isoquinolinium salt, a quaternary ammonium salt having a hydroxyl group, a quater- nary ammonium salt having ether linkages, a quaternary ammonium salt having amide linkages, etc.

Examples of the amphoteric surfactant are N-lauryl β-alanine, N-stearyl β-alanine, N,N,N-trimethylaminopropionic acid, N-hydroxyethyl N,N-dimethylaminopropionic acid, N-methyl N,N-dihydroxyethylaminopropionic acid, N,N,N-trihydroxyethylaminopropionic acid, N-lauryl N,N-dimethylaminopropionic acid, N-myristyl N,N-dimethyl-amino- propionic acid, N-palmityl N,N-dimethylaminopropionic acid, N-stearyl N,N-dimethylaminopropionic acid, N-hexyl N,N-dimethylaminoacetic acid, N-octyl N,N-dimethylaminoacetic acid, N-decyl N,N-dimethylaminoacetic acid, N-undecyl N,N-dimethylaminoacetic acid, N-lauryl N,N-dimethylaminoacetic acid, N-myristyl N,N-dimethylaminoacetic acid, N-palmityl N,N-dimethylaminoacetic acid, N-stearyl N,N-dimethylaminoacetic acid, 1-pyridium betaine, 1-α-picolinium betaine, etc.

Examples of the nonionic surfactant are a nonionic surfactant having ether linkages, a nonionic surfactant having ether and ester linkages, a nonionic surfactant having ester linkages, a nonionic surfactant comprising block polymers, a nonionic surfactant having nitrogen atoms, etc.

The nonionic surfactant having ether linkages includes a homogeneous polyoxyethylene ether; a polyoxyethylene alkyl ether or a polyoxyethylene alkylarylether such as a polyox- yethylene aliphatic alcohol ether, a polyoxyethylene alky- larylether or a polyoxyethylene lanolylether; a ethylene oxide derivative of a formaldehyde-condensed alkylphenol and ethylene oxide, etc.

The nonionic surfactant having ether and ester linkages includes a polyoxyethylene ether having ester linkages therein such as a polyoxyethylene sorbitan aliphatic ester, a polyoxyethylene glyceryl monoaliphatic ester, a polyoxyethylene propyleneglycol aliphatic ester and a polyoxyethylene sorbitol aliphatic ester; a polyoxyethylene derivative of natural fats and oils and waxes, etc.

The nonionic surfactant having ester linkages includes a polyoxyethylene aliphatic ester and an ester of a polyva- lent alcohol, etc.

The nonionic surfactant comprising block polymers includes a Pluronic nonionic surfactant, a Tetronic nonionic surfactant, a blockpolymer including alkyl groups, etc.

The nonionic surfactant having nitrogen atoms includes a polyoxyethylene aliphatic acid amide, an alkylol amide, a polyoxyalkylamine, etc.

Among the surfactants, an anionic surfactant is preferable. More preferred is an organic acid salt, an alkyl lactate, a N-acylamino acid salt and an alkylether carboxy- late. The anionic surfactants are usually available in a form of a sodium salt or an aqueous solution thereof.

It is preferable that a surfactant is included in an amount of 5 wt % or less in the total amount of the removing agent for silicone film adhering to the surface of a pane.

Preparation of the Removing Agent for Silicone Film adhering to the Surface of a Pane The removing agent of the invention can preferably be prepared by the following method as an example. A predetermined amount of a crystalline powder of the acidic fluoride is mixed with a predetermined amount of water. A solution containing both is prepared by stir. Then a predetermined amount of the powder is added to the solution and, if necessary, ammonium fluoride, an alkaline metal fluoride and other components are added. A desired removing agent for silicone film adhering to the surface of a pane is prepared by stir. Mixing order of the components is not limited to the aforementioned one.

Methods of mixing, addition and stir are not limited and known methods can be employed.

Method of Removing Silicone Film

With the removing agent of the invention, silicone film fast adhering to the surface of a pane is cleared by the following steps.

The removing agent is sprayed or applied onto the surface of a pane, preferably, so that all of the surface is evenly wet with the removing agent. On the surface a reaction shown by the following formula:

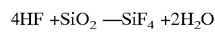

$$4HF + SiO_2 \longrightarrow SiF_4 + 2H_2O$$

proceeds and silicone film bonded to the surface of a pane by siloxane bonds dissolve in water. When the surface of a pane is allowed to stand with being wet with the removing agent, the removing agent flows down the surface, because the windshield and windows of, for example, a car are placed almost perpendicularly or with an inclination. With the flowing down of the removing agent, silicone film adhering to the surface also flows down.

When a powder is not included in the removing agent, a lot of water should be sprayed to the surface after the flowing down of the removing agent is finished in order to completely wash out the removing agent left and silicone film which has been separated from and is left on the surface.

In the case where a powder is included in the removing agent, if some of the removing agent is left on parts of the surface, the powder is also left on the parts. The powder indicates existence of the removing agent left on the surface. Then water for washing out the removing agent should be focussed on the parts in order to completely clear the removing agent. Silicone film which has been separated and is left on the surface may adsorb the powder. Then silicone film left on the surface can also be easily found.

Although it is most preferable that the removing agent is used according to the above-mentioned methods, a method of rubbing out silicone film with a sponge or a cloth soaked with the removing agent is also available.

The present invention can solve the conventional problems. The invention can provide a removing agent being capable of removing silicone film adhering fast to the surface of a pane of vehicles such as automobiles, aircraft, ships or trains quickly, easily, evenly and completely without making scratches on the surface. In the case where a powder is included in the removing agent, if some of the removing agent is left on parts of the surface of a pane after the treatment, the removing agent left can easily be cleared out with water applied to the parts.

A method according to the invention is clearing off silicone film adhering to the surface of a pane using a composition comprising an acidic fluoride and a powder. Because the powder adsorbs the acidic fluoride left on the surface, glass of the pane can be prevented from damages by the acidic fluoride left. Further, powders left on parts of the surface after the treatment directly indicate that some of the removing agent is left. Washing out the parts with water easily clears the removing agent left. Thus by a method of the invention, silicone film adhering to the surface of a pane can be cleared quickly, easily, evenly and completely without making scratches on the surface.

This invention will be illustrated below with reference to some examples. However, this invention should not be limited to these examples only.

(WORKING EXAMPLES 1–13 AND COMPARATIVE EXAMPLES 1–4)

Removing agents of the respective compositions shown in Table 1 were prepared. A method for the preparation was as follows. An acidic ammonium fluoride or an acidic potassium fluoride of an amount shown in Table 1, and ammonium fluo- ride, sodium fluoride or potassium fluoride of an amount shown in Table 1 were added to water of an amount shown in Table 1. They were mixed by stir. The obtained removing agents for silicone film adhering to the surface of a pane were evaluated by the following methods.

Evaluation A glass piece of 5 cm×10 cm×0.5 cm having been coated with a water repellent ("Rain Up Liquid" produced by Taiho Industries, Co. Ltd.) was used as a test piece. A silicone film had been formed on the surface of the test piece by the water repellent.

The surface of the test piece on which silicone film of the water repellent had been formed was rubbed with a sponge of 3 cm×3 cm×0.5 cm made of a foaming polyethylene soaked with 5 g of each sample of the removing agents with a uniform power. Then the surface to which the removing agent was applied was dried and water was flowed on the surface. Water repellency of the surface was observed with naked eyes. The above-mentioned operations were repeated. The number of times of the rubbing and an observed appearance of the surface at the time when the surface lost water repel- lency are shown in Table 1.

In Table 1, "too many" means that the surface did not lose water repellency although 20 or more times of the operations were repeated and "good" means the surface was clear, without muddiness or frost.

(COMPARITIVE EXAMPLES 5–6)

The procedures of Example 1 were repeated with the exception that commercially available abrasive-containing oil film removing agents were used in place of the removing agent of the invention. The results are shown in Table 1.

(COMPARATIVE EXAMPLES 7–9)

The procedures of Example 1 were repeated with the exception that commercially available liquid oil film removing agents were used in place of the removing agent of the invention. The results are shown in Table 1.

(WORKING EXAMPLES 14–26)

Removing agents having the respective compositions shown in Table 2 were prepared. A method for the preparation was as follows. An acidic ammonium fluoride or an acidic potassium fluoride of an amount shown in Table 2, and ammonium fluoride, sodium fluoride or potassium fluoride of an amount shown in Table 2 were added to water of an amount shown in Table 2. They were mixed by stir. The obtained removing agents for silicone film adhering to the surface of a pane were evaluated by the following methods.

Evaluation

A glass piece of 5 cm×10 cm×0.5 cm having been coated with a water repellent ("Rain Up Liquid" produced by Taiho Industries, Co. Ltd.) was used as a test piece. A silicone film had been formed on the surface of the test piece by the water repellent.

The surface of the test piece on which silicone film of the water repellent had been formed was rubbed with a sponge of 3 cm×3 cm×0.5 cm made of a foaming polyethylene soaked with 5 g of each sample of the removing agents with a uniform power. Then the surface to which the removing agent was applied was dried and water was flowed on the surface. Water repellency of the surface was observed with naked eyes. The above-mentioned operations were repeated. The number of times of the rubbing and an observed appearance of the surface at the time when the surface lost water repellency are shown in Table 2.

In Table 2, "too many" means that the surface did not lose water repellency although 20 or more times of the operations were repeated and "good" means the surface was clear, without muddiness or frost.

In these examples, the removing agents included powders. Therefore silicone film and the removing agents left on the surface could easily be found and they were able to be completely cleared.

TABLE 1

| | Acidic ammonium fluoride (wt %) | Acidic potassium fluoride (wt %) | Ammonium fluoride (wt %) | Sodium fluoride (wt %) | Potassium fluoride (wt %) | Water (wt %) | Numbers of times of rubbing | Appearance of the surface |
|---|---|---|---|---|---|---|---|---|
| Working Examples | | | | | | | | |
| 1 | 2.0 | — | — | — | — | 98.0 | 5 | good |
| 2 | 2.0 | — | 4.0 | — | — | 94.0 | 4 | good |
| 3 | 2.0 | — | — | 4.0 | — | 94.0 | 5 | good |
| 4 | 2.0 | — | — | — | 4.0 | 94.0 | 4 | good |
| 5 | — | 5.0 | — | — | — | 95.0 | 3 | good |
| 6 | — | 5.0 | 7.5 | — | — | 87.5 | 3 | good |
| 7 | — | 5.0 | — | 7.5 | — | 87.5 | 2 | good |
| 8 | — | 5.0 | — | — | 7.5 | 87.5 | 2 | good |
| 9 | 7.5 | — | — | — | — | 92.5 | 2 | good |
| 10 | 7.5 | 10.0 | — | — | — | 82.5 | 1 | good |
| 11 | — | 7.5 | — | — | — | 92.5 | 2 | good |
| 12 | — | 7.5 | — | — | — | 82.5 | 1 | good |
| 13 | — | 7.5 | — | — | 10.0 | 82.5 | 1 | good |
| Comparative Examples | | | | | | | | |
| 1 | 0.1 | — | — | — | — | 99.9 | too many | good |
| 2 | — | 0.1 | — | — | — | 99.9 | too many | good |
| 3 | 16.0 | — | — | — | — | 84.0 | 1 | white muddiness |
| 4 | — | 16.0 | — | — | — | 84.0 | 1 | white muddiness |
| 5 | | | Product A1 (abrasive-containing) | | | | 7 | good |
| 6 | | | Product B1 (abrasive-containing) | | | | 10 | good |
| 7 | | | Product A2 (liquid) | | | | too many | good |
| 8 | | | Product B2 (liquid) | | | | too many | good |
| 9 | | | Product C2 (liquid) | | | | too many | good |

*Product A1 is a commercially available abrasive-containing oil film removing agent produced by A company.
*Product B1 is a commercially available liquid oil film removing agent produced by B company.
*Product A2 is a commercially available liquid oil film removing agent produced by A company.
*Product B2 is a commercially available liquid oil film removing agent produced by B company.
*Product C2 is a commercially available liquid oil film removing agent produced by B company.

TABLE 2

| | Acidic ammonium fluoride (wt %) | Acidic potassium fluoride (wt %) | Powder kind/ wt % | Ammonium fluoride (wt %) | Sodium fluoride (wt %) | Potassium fluoride (wt %) | Water (wt %) | Numbers of times of rubbing | Appearance of the surface |
|---|---|---|---|---|---|---|---|---|---|
| Working Examples | | | | | | | | | |
| 14 | 2.0 | — | a/10 | — | — | — | 88.0 | 5 | good |
| 15 | 2.0 | — | b/5 | 4.0 | — | — | 89.0 | 4 | good |
| 16 | 2.0 | — | c/0.8 | — | 4.0 | — | 93.2 | 5 | good |
| 17 | 2.0 | — | d/1 | — | — | 4.0 | 93.0 | 4 | good |
| 18 | — | 5.0 | b/0.5 | — | — | — | 94.5 | 3 | good |
| 19 | — | 5.0 | d/5 | 7.5 | — | — | 82.5 | 3 | good |
| 20 | — | 5.0 | e/3 | — | 7.5 | — | 84.5 | 2 | good |
| 21 | — | 5.0 | a/2 | — | — | 7.5 | 85.5 | 2 | good |
| 22 | 7.5 | — | c/3 | — | — | — | 89.5 | 2 | good |
| 23 | 7.5 | 10.0 | e/1 | — | — | — | 81.5 | 1 | good |

TABLE 2-continued

|  | Acidic ammonium fluoride (wt %) | Acidic potassium fluoride (wt %) | Powder kind/ wt % | Ammonium fluoride (wt %) | Sodium fluoride (wt %) | Potassium fluoride (wt %) | Water (wt %) | Numbers of times of rubbing | Appearance of the surface |
|---|---|---|---|---|---|---|---|---|---|
| 24 | — | 7.5 | a/5 | — | — | — | 87.5 | 2 | good |
| 25 | — | 7.5 | c/4 | 10.0 | — | — | 78.5 | 1 | good |
| 26 | — | 7.5 | b/1 | — | — | 10.0 | 81.5 | 1 | good |

Note
a: a powder of polyethylene (particle diameter: 0.5 μm)
b: titanium oxide (particle diameter: 0.7 μm)
c: alumina (particle diameter: 0.2 μm)
d: a powder of a methylmethacrylate homopolymer (particle diameter: 5 μm)
e: zinc oxide (particle diameter: 20 μm)

What we claim is:

1. A removing agent for silicone film adhering to a surface of a pane which comprises water and at least one acidic fluoride selected from the group consisting of an acidic ammonium fluoride and an acidic potassium fluoride wherein an amount of the acidic fluoride is from 0.15 to 15 wt % of the total amount of the agent.

2. A removing agent according to claim 1, further comprising a powder.

3. A removing agent according to claim 1, further comprising ammonium fluoride of once to twice as much by weight as the acidic fluoride.

4. A removing agent according to claim 2, further comprising ammonium fluoride of once to twice as much by weight as the acidic fluoride.

5. A removing agent according to claim 1, further comprising an alkaline metal fluoride of once to twice as much by weight as the acidic fluoride.

6. A removing agent according to claim 2, further comprising an alkaline metal fluoride of once to twice as much by weight as the acidic fluoride.

7. A removing agent according to claim 3, further comprising an alkaline metal fluoride of once to twice as much by weight as.the acidic fluoride.

8. A removing agent according to claim 4, further comprising an alkaline metal fluoride of once to twice as much by weight as the acidic fluoride.

9. A removing agent according to claim 5, wherein the alkaline metal fluoride is sodium fluoride.

10. A removing agent according to claim 6, wherein the alkaline metal fluoride is sodium fluoride.

11. A removing agent according to claim 5, wherein the alkaline metal fluoride is potassium fluoride.

12. A removing agent according to claim 6, wherein the alkaline metal fluoride is potassium fluoride.

13. A removing agent according to claim 2, wherein a particle diameter of the powder is from 0.5 to 20.0 μm.

14. A removing agent according to claim 2, wherein an amount of the powder is from 0.05 to 20 wt % of the total amount of the removing agent.

15. A method for removing silicone film adhering to a surface of a pane which comprises applying the removing agent of claim 1 to the surface, removing a liquid component, and removing a powder component from the surface.

16. A method for removing silicone film adhering to a surface of a pane which comprises applying the removing agent of claim 2 to the surface, removing a liquid component, and removing a powder component from the surface.

* * * * *